United States Patent [19]
Finnell

[11] Patent Number: 5,951,656
[45] Date of Patent: Sep. 14, 1999

[54] METHOD AND SYSTEM FOR CONTROLLING QUEUE DELETIONS IN WHICH POINTER CORRESPONDING TO ITEM TO BE DELETED IS MOVED BACK AND POINTERS FOR ITEMS AFTER DELETED ITEM ARE SHIFTED

[75] Inventor: James S. Finnell, San Jose, Calif.

[73] Assignee: Hewlett-Packard Company, Palo Alto, Calif.

[21] Appl. No.: 08/792,329

[22] Filed: Jan. 31, 1997

[51] Int. Cl.[6] ...................................................... G06F 7/00
[52] U.S. Cl. ................................................ 710/54; 710/52
[58] Field of Search ................................... 395/872, 874; 325/56; 710/52, 54

[56] References Cited

U.S. PATENT DOCUMENTS

| | | | |
|---|---|---|---|
| 4,420,807 | 12/1983 | Nolta et al. | 364/200 |
| 4,719,592 | 1/1988 | Hunt | 364/900 |
| 4,953,122 | 8/1990 | Williams | 364/900 |
| 5,472,756 | 12/1995 | Traylor | 395/250 |
| 5,596,725 | 1/1997 | Ferguson et al. | 395/250 |

*Primary Examiner*—Thomas C. Lee
*Assistant Examiner*—Albert Wang
*Attorney, Agent, or Firm*—Denise A. Lee

[57] ABSTRACT

The queue management control system according to the present invention provides a system that elegantly handles unlimited queue deletions without bubbles. The queue management control system is comprised of: a plurality of item registers; and a control logic block electrically coupled to the plurality of item registers. The control logic block includes an item tracking means, a plurality of pointer registers, and an item ordering means. The pointer registers are connected in a loop configuration so that the order of the contents of the pointer registers mirrors the behavior of a FIFO queue. Because of the one-to-one correspondence between the values stored in the pointer storage registers and the item registers, the contents of each pointer register may be mapped to a particular item register. This allows tracking of the order of the items in the item register to be serviced by the servicing logic by the contents of the pointer register.

16 Claims, 9 Drawing Sheets

METHOD AND SYSTEM FOR CONTROLLING QUEUE DELETIONS IN WHICH POINTER CORRESPONDING TO ITEM TO BE DELETED IS MOVED BACK AND POINTERS FOR ITEMS AFTER DELETED ITEM ARE SHIFTED

BACKGROUND OF THE INVENTION

In modern computer systems, a First-In-First-Out (FIFO) buffer may be needed between two devices that are functioning independently or that have different data transfer rates. Control hardware must be designed to control the items of data or instructions stored in the FIFO queues. In a FIFO queue, items enter an input port and move sequentially through the queue of item registers to an output port. FIFO queues typically hold instructions, data, addresses or transactions, which are referred to collectively as "items." As items are added to the queue, control logic is required to keep track of where each item is stored and its order relative to other items. When new items are added to a queue they are placed at the back of the queue. Items are then moved forward toward the front of the queue in a process called advancing the queue. When an item reaches the front of the queue, it becomes eligible to be serviced.

Servicing an item may entail, for example, moving the item to another part of the system, decoding the item or any number of other defined actions. Once an item is serviced, it is no longer needed and can safely be discarded. Once an item has been serviced and discarded, the entire queue advances such that each item in the queue moves one step closer to the front of the queue. Sometimes items are deleted from a queue before they reach the front; this is referred to as "queue deletion." Queue deletion generally results in a "bubble" in the queue. A bubble is an invalid item that must not be serviced surrounded by valid items that must be serviced.

Modern computer systems require specialized hardware to perform queue management control functions. FIG. 1 shows a block diagram of a queue management controller 100. The queue management controller 100 is comprised of a plurality of item registers $102_{1-n}$ nconnected in series and a plurality of valid bit registers $104_1$–$104_n$ connected in series. Each item register $102_1$–$102_n$ has a corresponding valid bit register $104_1$–$104_n$. The output of the item register $102_n$ and the output of the front valid bit register $104_n$ are both connected to the servicing logic means 106 of the queue controller. The valid bit corresponding to each item register identifies whether an item is to be serviced. In the embodiment shown in FIG. 1, the valid bit registers $104_1$–$104_n$ is set to one to identify an item that needs servicing. The valid bit register $104_1$–$104_n$ is cleared to identify an item that should not be serviced (a queue deletion.)

In operation, items are loaded into the first item register 102, and then as the registers are clocked, the items advance through the queue of registers until the item reaches the "front" register $102_n$ where it can be serviced and/or discarded. When an item to be serviced (Valid bit=1) reaches the "front" register, the item is serviced and then discarded. When an item that is not to be serviced reaches the front register, it is discarded after a brief delay when it is examined.

The primary disadvantage of the queue management controller shown in FIG. 1 is the delay from the time an item is inserted into item register 102 until it reaches item register $102_n$ where it can be examined and serviced. This delay is typically equal to one cycle for each of the n item registers and therefore can be very severe. There is also an obvious disadvantage to this method of handling queue deletions-by allowing the bubble to advance to the front of the queue, a cycle is lost examining and discarding it that could otherwise be spent servicing the next valid item.

In an alternative queue management control system, queue deletions may be handled by the queue management controller by selectively clocking the portion of the queue from the deleted item backwards to eliminate the bubble. However, this technique only eliminates the one cycle delay which is lost when the bubble advances to the front of the queue and does not eliminate the delay from the time the item is inserted into the register $102_1$ until it reaches item register $102_n$. Compared to the clocking shown in FIG. 1 where the clocks on all the registers are tied together, selective clocking increases the complexity of the circuitry supporting the clocking function.

FIG. 2 shows a block diagram of an alternative prior art queue management controller 200. The queue management controller 200 includes a plurality of item registers $202_1$–$202_n$ and a counter control logic means. The counter control logic means includes: a back pointer logic block 206, a front pointer logic block 208 and a valid item counter 210. The counter control logic means 204 and the item registers $202_1$–$202_n$ are connected to a servicing logic means 214.

In contrast to the queue management controller 100 shown in FIG. 1 which uses valid bits to determine if an item is to be serviced, the queue management controller 200 uses counter logic to determine whether an item is to be serviced. Special pointer registers indicate which registers are the front and back of the queue. A count of the items in the queue is maintained by the valid item counter 210. As long as the count of the valid item counter 210 is greater than zero, servicing of items at the front of the queue continues.

In contrast to the queue management controller 100 shown in FIG. 1, the item registers of the queue management controller 200 can be accessed individually. To insert an item into the queue, the item is loaded into the register indicated by the back pointer register. After the item is loaded, the back pointer register incremented to point to the next register. The front pointer register points to the register currently being serviced. When the item in the front pointer register has been serviced, this pointer register value is incremented to point to the next item to be serviced. If the value of either the front pointer register or the back pointer register is greater than the value of the highest register number after being incremented, the value of that pointer register is set to zero (wraparound condition).

Compared to the queue management controller 100 shown in FIG. 1, the queue management controller 200 eliminates the long servicing delay for the first item to be inserted into a queue and is a good choice for many queues. However, the queue management controller 200, does not handle queue deletions well. Valid bit registers may be added for each of the corresponding item registers so that queue deletions can be allowed, however, eliminating the bubbles that result from queue deletions is difficult. For queues that experience a significant number of queue deletions, a high percentage of bubbles implies very inefficient use of queue registers.

In a competitive business environment, computer systems must provide the highest level of performance with a minimum of circuitry complexity. The queue management controller shown in FIG. 1, handles bubbles and queue deletions well, it is at the cost of processor delay. The queue management controller shown in FIG. 2, is flexible in that items may be loaded anywhere in the queue, however, the queue management controller does not deal well with queue deletions. An improved method and apparatus for management of queues having deleteable entries which minimizes bubble formation and processor delay is needed.

SUMMARY OF THE INVENTION

The queue management control system according to the present invention provides a system that elegantly handles queue deletions without bubbles and which services items inserted into an empty queue immediately. The queue management control system is comprised of: a plurality of item storage means; and a control logic means electrically coupled to the plurality of item storage means. The control logic means is comprised of: an item tracking means, a plurality of pointer storage means, and an item ordering means.

The item tracking means includes a sequence generation means, typically an item counter, and a backpointer selection means, typically a multiplexor. The item tracking means is electrically coupled to the plurality of pointer storage means so that information relating to the validity of an item can be used to effect the ordering of the values in the pointer registers. The sequence generation means generates a unique sequence of non-repetitive values, where the number of non-repetitive values corresponds to the number of item storage means. Further, each one of the non-repetitive values corresponds to one of the plurality of item storage means.

The sequence generation means is electrically coupled to the backpointer selection means. The backpointer selection means indicates which item register the next new item is loaded into. The pointer storage means are connected in a loop configuration so that the order of the pointer storage means mirrors the behavior of a FIFO queue. The number of pointer storage means is equal to the number of the item storage means and each of the non-repetitive values corresponding to the values of the sequence generation means is stored in one, and only one, of the pointer storage means. Because of the one-to-one correspondence between the values stored in the pointer storage means and the item registers, the contents of each pointer register may be mapped to a particular item register. This allows tracking of the desired order of the items in the item storage means to be serviced by the servicing logic by the contents of the pointer storage means.

The control logic means includes an item ordering means for controlling the order of non-repetitive values stored in the pointer storage means. Tile item ordering means is electrically coupled to the plurality of pointer storage means and is typically is comprised of a plurality of shift control blocks, comprised of a plurality of logic components. The shift control block performs partial and full shifts on the contents of the pointer storage means in order to control the order of the non-repetitive values stored in the pointer storage means. Pointer registers connected in loop act as FIFO to keep track of unique sequence of values that map (or point) to item registers. Mapping between pointer registers to item registers in combination with a unique identifier (a non-repetitive value) for each item register, allows the queue management system to keep track of which items are to be serviced.

The queue management control system allows new items to be serviced as soon as they are inserted into the queue without sacrificing the capability to handle queue deletions. In order to avoid bubbles that can be caused by queue deletions, the control logic means shifts the pointer storage means contents rather than changing the actual item storage means values. This is more efficient than conventional queue management systems and can be done transparently. The queue management system can be easily expanded to handle any reasonable depth queue.

In the present invention, the order of the items in the item registers does not necessarily correspond to the order which they will be serviced by the servicing logic. The item counter typically keeps track of where in the sequence the queue management control system is so that the next item can be serviced. The pointer registers keep track of the order of the item registers by keeping track of the deletions and responsive to those deletions, shifting the order of the pointer register contents corresponding to the item registers accordingly.

In conventional queue management control systems, bubbles are typically formed unless the queue management control system has the ability to change or move the loaded item from the original item register the item was loaded into. In the present invention, once an item is loaded into a particular item register, the contents of that item register stays the same until the item is serviced by the servicing logic and a new item is loaded into the item register. It is the order of the contents of the pointer storage registers that is changed.

A further understanding of the nature and advantages of the present invention may be realized with reference to the remaining portions of the specification and attached drawings.

DETAILED DESCRIPTION OF THE PREFERRED EMBODIMENTS

Figure 1:
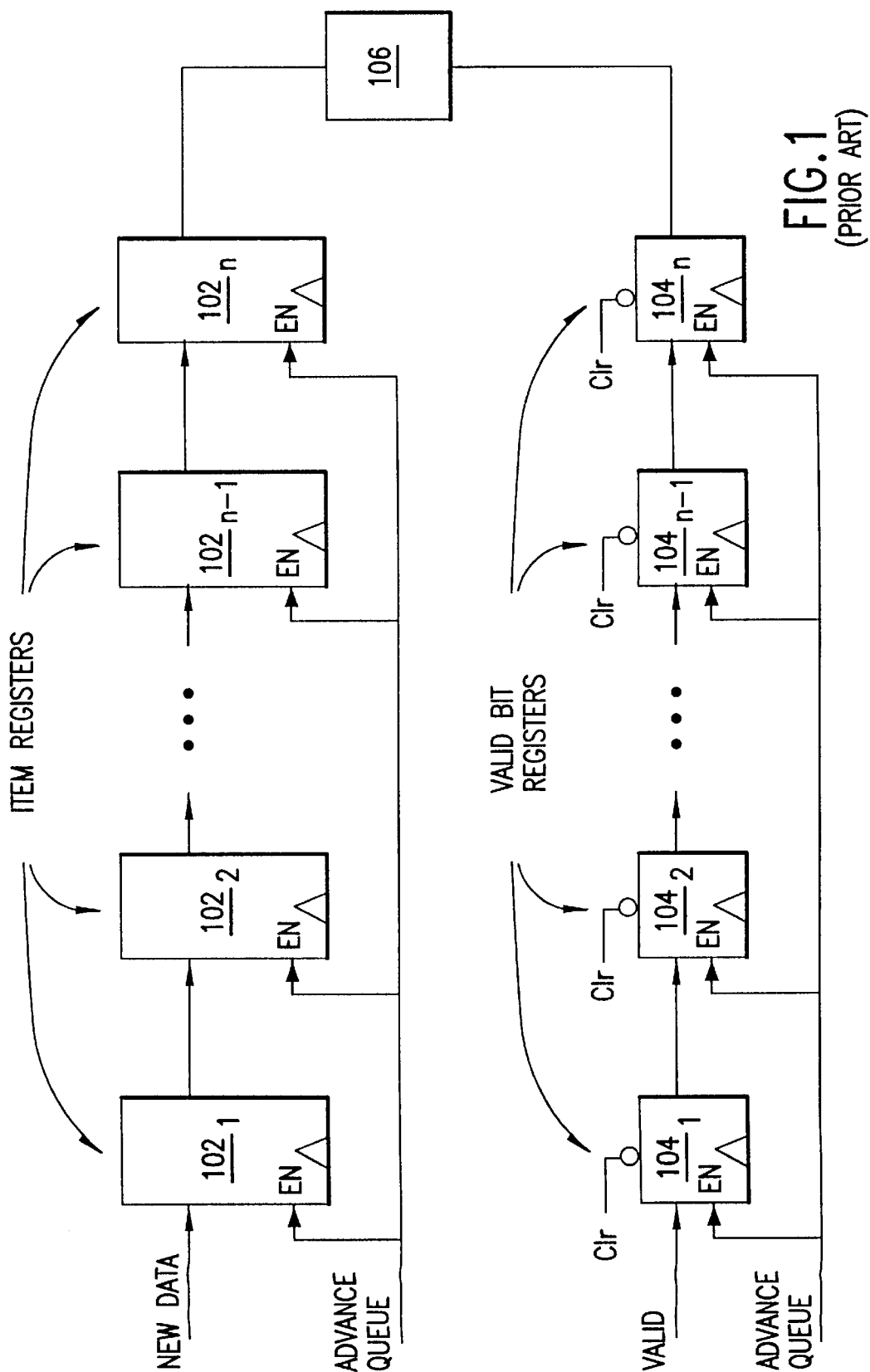
FIG. 1 shows a block diagram of a queue management controller according to the prior art.
Figure 2:
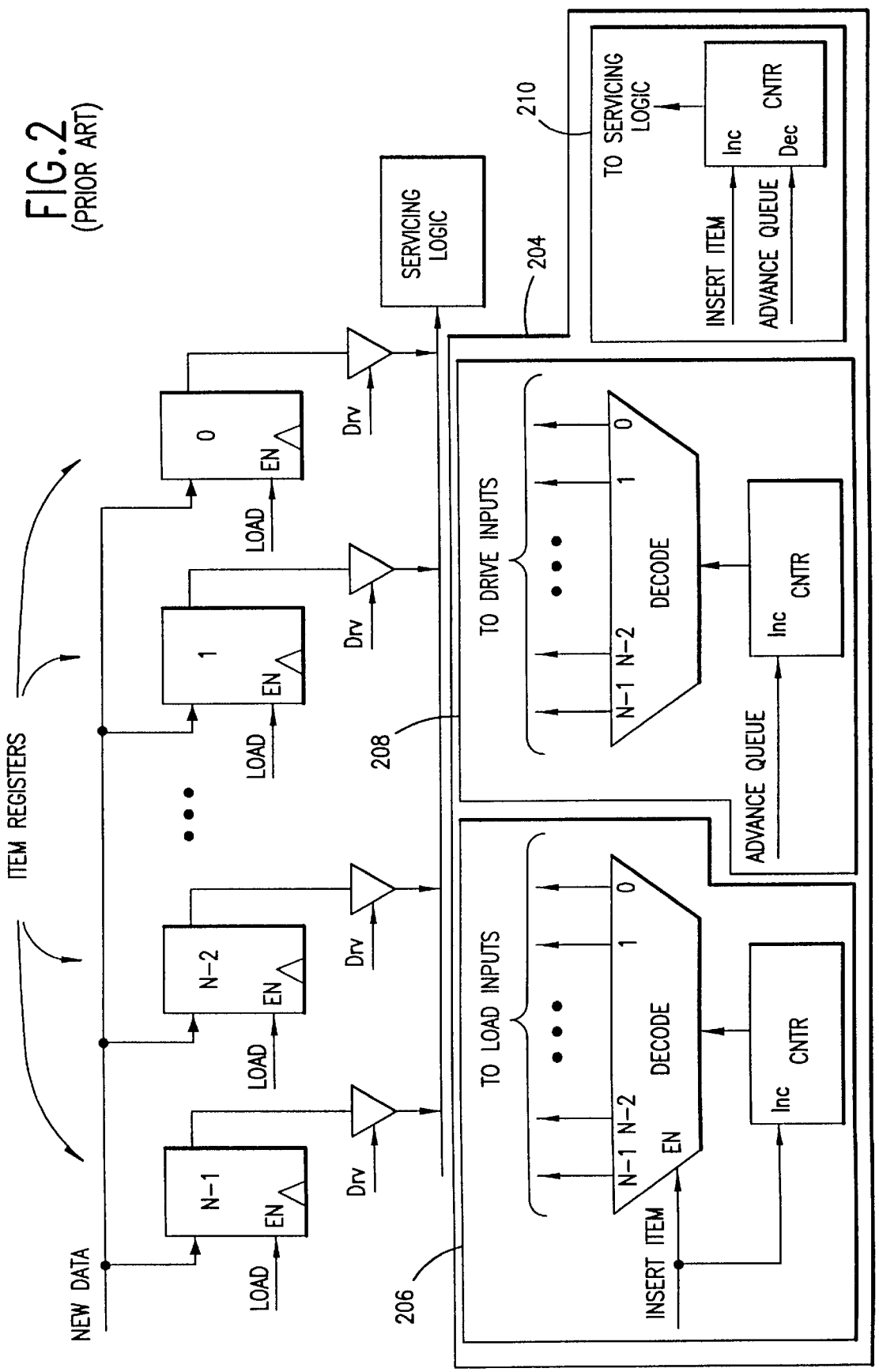
FIG. 2 shows an a block diagram of an alternative queue management controller system according to the prior art.
Figure 3:
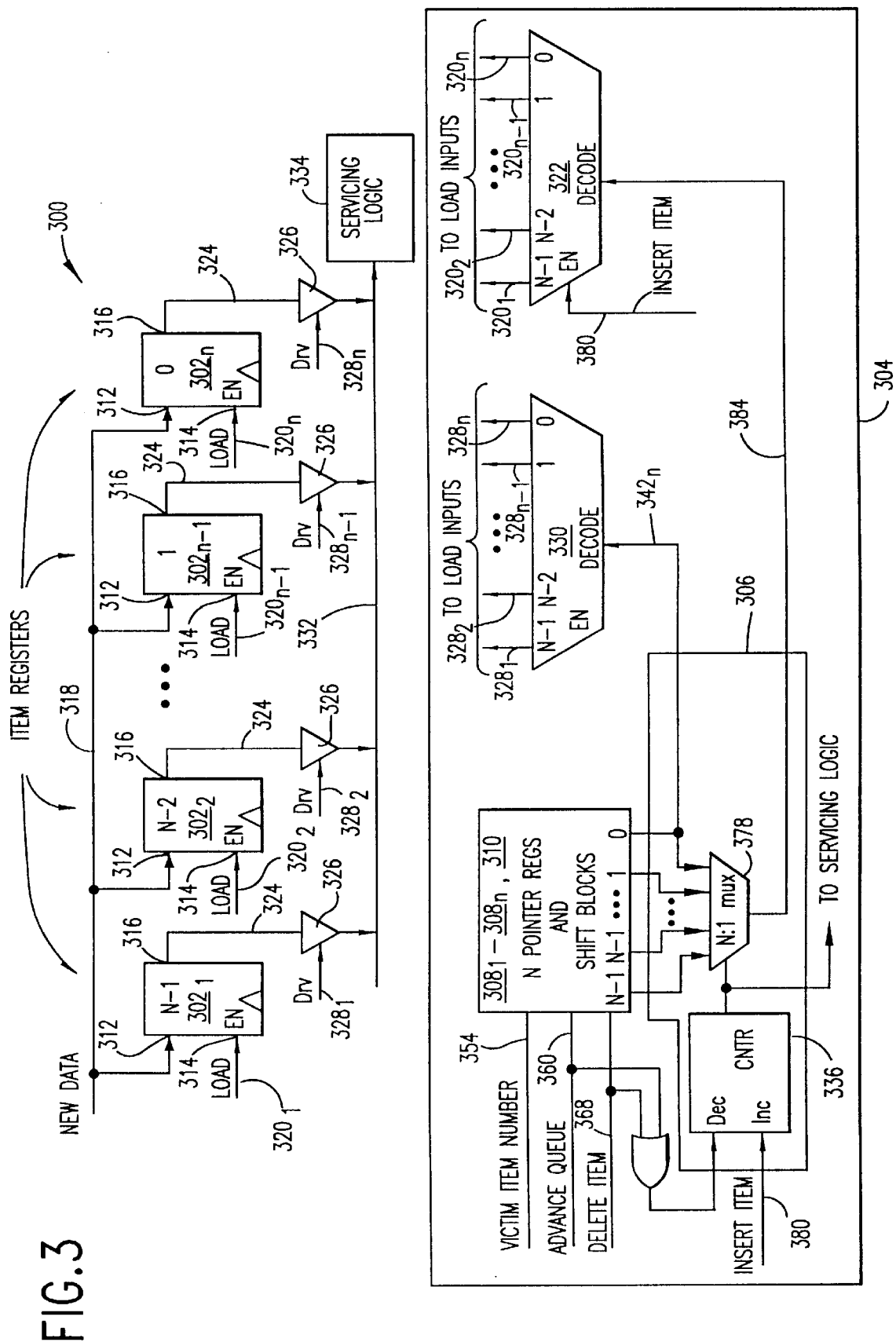
FIG. 3 shows a block diagram of the queue management control system according to the present invention.

The present invention is a queue management control system for presenting items to the servicing logic in an orderly fashion. Referring to FIG. 3 shows a block diagram of a queue management control system 300. The queue management control system 300 is comprised of: a plurality of item storage means $302_1$–$302_n$, wherein each of the plurality of item storage means $302_1$–$302_n$ may be individually accessed; and a control logic means 304 electrically coupled to the plurality of item storage means $302_1$–$302_n$. The control logic means 304 is comprised of: an item tracking means 306, a plurality of pointer storage means $308_1$–$308_n$, and an item ordering means 310.

Referring to FIG. 3 shows a plurality of item storage means or item registers $302_1$–$302_n$ for storing items in the queue. When a new item is inserted into the queue, it is loaded into one of the plurality of item registers $302_1$–$302_n$. In the illustrative embodiment, there are n item registers, each item register holding eight bits of data forming an n×8 queue. Although the described embodiment holds eight bits of data per item, alternative embodiments of the invention may provide item register sizes as is required by the application.

Although other item storage means $302_1$–$302_n$ besides latches may be used, in the preferred embodiment each item storage means $302_1$–$302_n$ is a latch. Referring to FIG. 3, each item register $302_1$–$302_n$ may be individually accessed and includes a first input port 312, a second input port 314 and an output port 3 16. The first input port 312 is electrically coupled to the new data signal 318 which is the electronic signal for data that is to be added to the queue. The second input port 314 (the enable signal of the item register) is electrically coupled to the load signal $320_1$–$320_n$.

The load signal $320_1$–$320_n$ is output from the load signal decoding means 324. The load signal decoding means 324 is an n:1 decoder and chooses which of the plurality of item registers 302 will have its load signal enabled. The item register $302_1$–$302_n$ is enabled by a high load signal, indicating that the item register $302_1$–$302_n$ is ready to receive new a item. When the item register $302_1$–$302_n$ is enabled, data is input into the item register $302_1$–$302_n$ and is held for a clock cycle before being output on the output line 324.

The item registers $302_1$–$302_n$ are typically configured to drive a common tri-state bus, the servicing logic bus. Thus in the embodiment shown in FIG. 3, the output port 316 of each item register is electrically coupled to a tristate driver 326. The input ports of the tristate driver 326 are electrically coupled to: (1) a Drv signal $328_1$–$328_n$ from the drive signal decoding means 330 and (2) the output value 324 stored in the corresponding item register $302_1$–$302_n$. In the embodiment shown in FIG. 3, the control logic means 304 further includes a drive signal decoding means 330 for determining when the item stored in the item register is loaded onto the bus to be serviced by the servicing logic. When the Drv signal $328_1$–$328_n$ to the item register $302_1$–$302_n$ is high, the tristate driver 326 outputs the new item onto the tristate bus or servicing logic bus 332 to be serviced by the servicing logic means 334.

Figure 4:
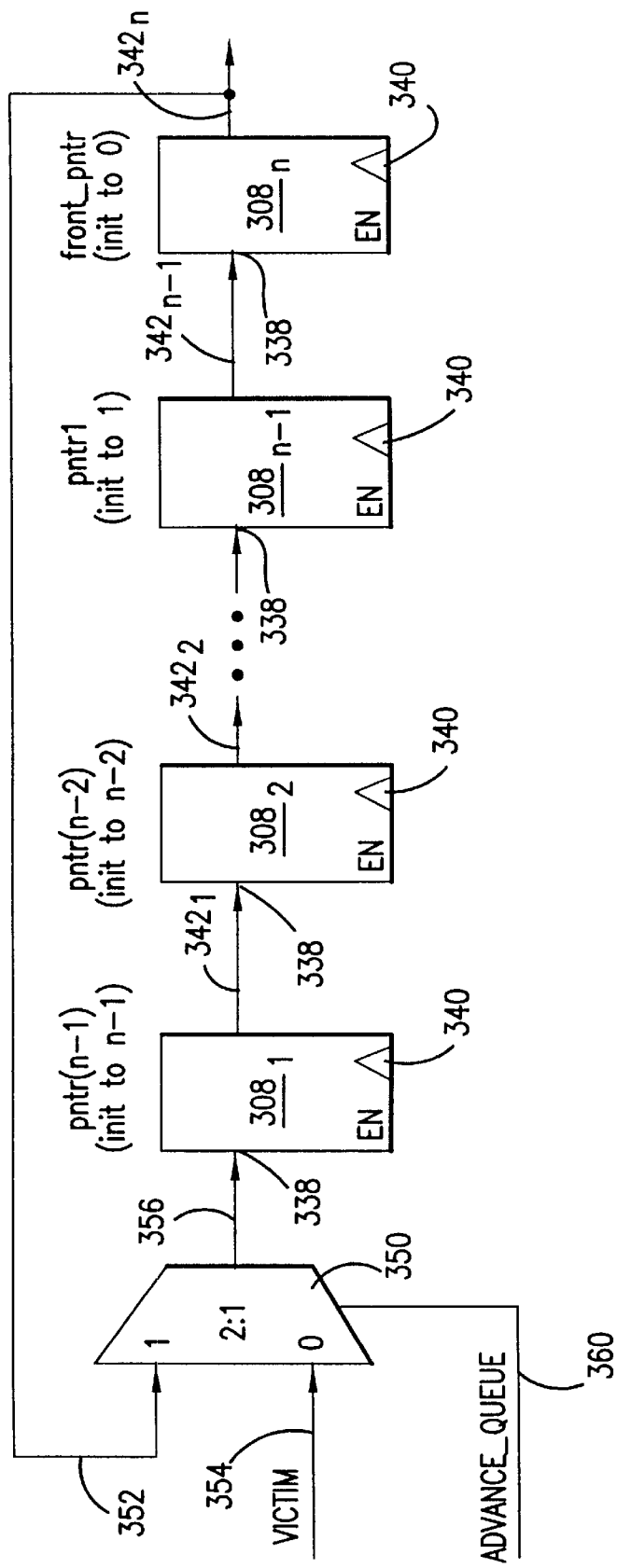
FIG. 4 shows a block diagram of the pointer registers and deletion select multiplexor according to the present invention.

The control logic means 304 of the queue management control system 300 includes: an item tracking means 306, a plurality of pointer storage means $308_1$–$308_n$ and an item ordering means 310. FIG. 4 shows a block diagram of the pointer registers 308 and deletion select multiplexor 354 according to the present invention. The pointer storage means, also referred to as pointer registers $308_1$–$308_n$, are connected in a loop configuration, so that the order of the pointer storage means $308_1$–$308_n$ mirrors the behavior of a FIFO queue. The number of pointer storage means $308_1$–$308_n$ is equal to the number of item storage means $302_1$–$302_n$ and each of the non-repetitive values corresponding to the values of the sequence generation means 336 is stored in one, and only one, of the pointer storage means $308_1$–$308_n$. Because of this one-to-one correspondence between the values stored in the pointer registers $308_1$–$308_n$ and the item registers $302_1$–$302_n$, the contents of each pointer register $308_1$–$308_n$ may be mapped to a corresponding item register $302_1$–$302_n$. This allows tracking of the desired order of the items in the item storage means $302_1$–$302_n$ to be serviced by the servicing logic 334 by the contents of the pointer storage means $308_1$–$308_n$.

Although the items for each item register $302_1$–$302_n$ may be accessed individually and thus may be read out of sequential order, the order of the items output onto the servicing bus 332 is controlled by the pointer registers $308_1$–$308_n$ so that the first item stored in the item register $302_1$–$302_n$ is the first item serviced by the servicing logic 334. Thus the pointer registers $308_1$–$308_n$ control the order so that the queue is a FIFO. Each pointer register $308_1$–$308_n$ is comprised of a storage means, preferably a latch. The pointer registers $308_1$–$308_n$ are k-bit registers (where k is an integer value where $2k \geq N$) which can be individually accessed. The item registers $302_1$–$302_n$ that correspond to the value stored in pointer storage means $308_1$–$308_n$ are accessed by the servicing logic means 334 in a cyclical order to mirror the behavior of a FIFO. In the preferred embodiment, the pointer storage means are connected in series in a loop connection to mirror the behavior of a FIFO.

Figure 5:
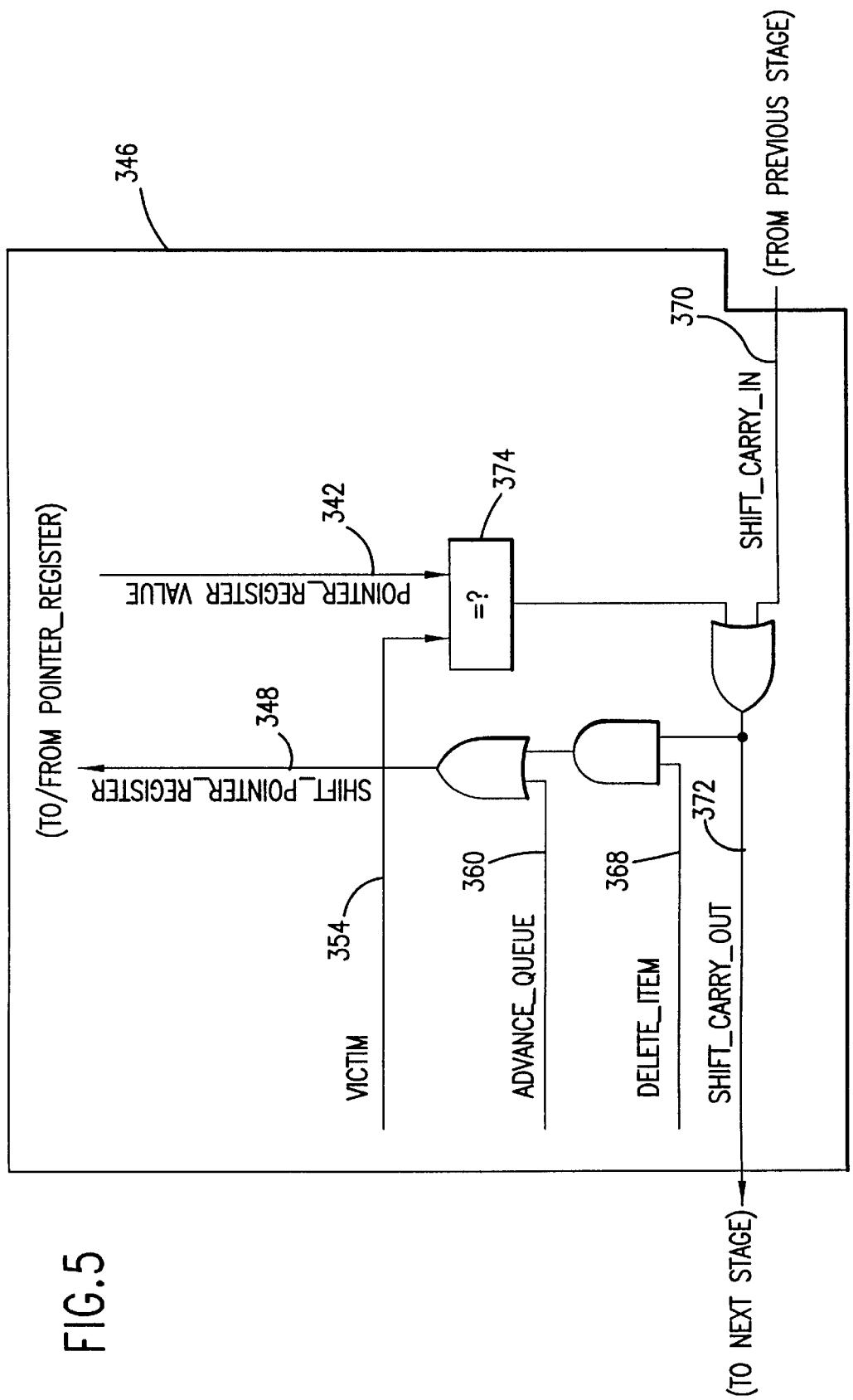
FIG. 5 shows a block diagram of the shift control logic block according to the present invention.

Referring to FIG. 4, each pointer register $308_1$–$308_n$ includes a first input port 338, a second input port 340 and an output port 341. The first input port 338 of each pointer register $308_1$–$308_n$ is electrically coupled to the item signal for the corresponding item register 302. FIG. 5 shows a block diagram of a shift control logic means 346 which is part of the item ordering means 310. Referring to FIGS. 4 and 5, the shift pointer register signal 348 is connected to the second input port 340 (the enable signal of the item register) of the pointer register. The output signal $342_1$–$342_n$ from each pointer register $308_1$–$308_n$ is the pointer register value signal for the corresponding pointer register. In the illustrative embodiment shown in FIGS. 4 and 5, the shift pointer register signal 348 enables the pointer register $308_1$–$308_n$ when the load signal is high so that a new value representative of the item can be loaded into the pointer register $308_1$–$308_n$. The load enables for each pointer register comes from its corresponding shift control means 346.

The number of pointer registers 308 is equal to the number of item registers $302_1$–$302_n$. Each pointer register $308_1$–$308_n$ is initialized, prior to its use, so that each pointer register $308_1$–$308_n$ is mapped to a different item register $302_1$–$302_n$. In the preferred embodiment, the pointer registers 308 are initialized with the values 0 through n−1. The front pointer register $308_n$ is initialized to 0. Each pointer register in the series moving away from the front pointer register has an initialization value that is incremented by 1. Thus the pointer register $308_{n-1}$ has a value of 1, the pointer register $308_2$ has a value of (n−2) and the pointer register $308_{n-1}$ has a value of (n−1).

In the embodiment shown in FIG. 4, the pointer registers $308_1$–$308_n$ are initialized to a set of sequential values. In the embodiment in FIG. 4, pointer register $308_n$ (the front pointer register) is initialized to a value of zero, pointer register $308_{(n-1)}$ is initialized to a value of one, pointer register $308_{(n-2)}$ is initialized to a value of two, pointer register $308_2$ is initialized to a value of n−2, and pointer register $308_1$ is initialized to a value of n−1.

Assume for example, that n has a value of 6 and the pointer registers $308_1$–$308_n$ are initialized to sequential values 0 to 5. Then, pointer register $308_6$ (the front pointer register) is initialized to a value of zero, pointer register $308_5$ is initialized to a value of one, pointer register $308_4$ is initialized to a value of two, pointer register $308_3$ is initialized to a value of 3, pointer register $308_2$ is initialized to a value of 4, and pointer register $308_1$ is initialized to a value of 5. However in an alternative embodiment, the item register numbers stored in the pointer registers $308_1$–$308_n$ may be initialized to any set of six unique numbers, where by unique we mean there is no repetition of values within the set of six numbers. For example, the pointer registers $308_1$–$308_n$ may initialized to the values 6, 7, 8, 9, 10 and 11. Further, the set of six numbers may be in any order. For example, the set of six numbers may be initialized to the values 4, 2, 5, 0, 1, and 3. Thus, it is not necessary that the values that the pointer registers $308_1$–$308_n$ are initialized to be in sequential order corresponding to the order of the registers. However, there must be a 1:1 correspondence between the item register numbers stored in the pointer registers $308_1$–$308_n$ and the item registers $302_1$–$302_n$.

The deletion select multiplexor 350 is a simple k-bit 2:1 multiplexor that selects the value to be loaded into the pointer register pntr (n−1) whenever the queue is advanced or an item is to be deleted. The two inputs to the deletion select multiplexor 350 are: (1) the output of the front pointer register 352, and (2) the victim signal 354 (the unique value representing the item register that is to be deleted.) The deletion select multiplexor 350 selects the front pntr value (the output of pointer register $308_n$) when the queue is being advanced, and the victim when an item is being deleted from the queue.

When the queue is being advanced, the front pntr value is output from the delete selection multiplexor 350 on line 356 and the shift pointer register signal is high. The high shift pointer register signal enables each pointer register to load the item register value from the previous stage into the next pointer register, resulting in a full shift of the pointer register. When an item is being deleted, the victim is selected by the deletion select multiplexor 350 and is output onto line 356. When the delete item signal is high, the victim signal input to the delete selection multiplexor 356 must be valid. When the delete item signal is high, each pointer register following the pointer register holding the item register number to be deleted is enabled. Thus a new item register number is loaded into each pointer registers including and following the pointer register holding the victim, resulting in a shift of item register numbers in those pointer registers.

The deletion select multiplexor 350 is controlled by the advance queue signal 360. The advance queue signal 360 transitions when the servicing logic 334 is done servicing the item at the front of the queue. The timing for deletions is controlled by the delete item signal; the timing for queue advances is controlled by the advance queue signal. Items may not be deleted from the queue during the same cycle that the queue is being advanced.

The control logic means includes an item ordering means 310 for controlling the order of non-repetitive values stored in the pointer storage means. The item ordering means 310 is electrically coupled to the plurality of pointer storage means $308_1$–$308_n$ and is typically is comprised of a shift control block 346, comprised of a plurality of logic components. The shift control block 346 performs partial and full shifts on the contents of the pointer storage means $308_1$–$308_n$ in order to control the order of the non-repetitive values stored in the pointer storage means $308_1$–$308_n$. Pointer registers $308_1$–$308_n$ connected in loop act as FIFO to keep track of unique sequence of values that map to item registers $302_1$–$302_n$. Mapping between pointer registers to item registers in combination with a unique identifier (a non-repetitive value) for each item registers, keeps track of which items are to be serviced.

Figure 8:
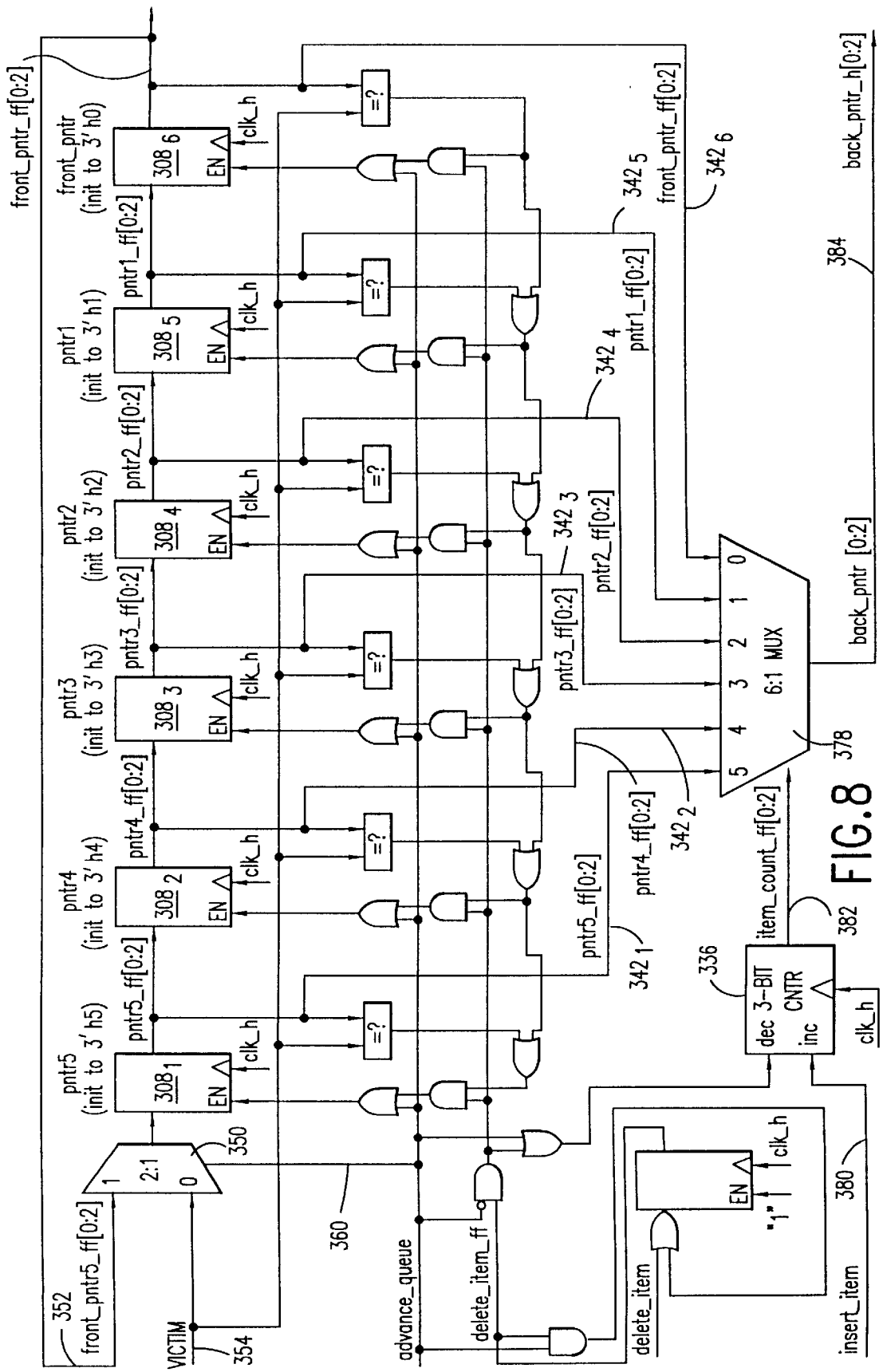
FIG. 8 shows a partial block diagram of the queue management control system according to the present invention which shows multiple shift control logic blocks.

The shift control logic block 346 controls the shifting of the contents of the pointer registers $308_1$–$308_n$ (the item register numbers) after either the deletion of object or the advancement of the queue. FIG. 5 shows a block diagram of the shift control logic block 346 according to the present invention. Although only a single shift control block 346 is shown in FIG. 5, each pointer register $308_1$–$308_n$ has a corresponding shift control block 346. FIG. 8 shows a partial block diagram of the queue management control system according to the present invention which shows the connection of the pointer registers to its corresponding shift control logic blocks.

In the illustrative embodiment shown in FIG. 5, each of the shift control blocks 346 in the preferred embodiment of the invention are comprised of a: a k-bit equality comparator and three 2-input logic gates. Each shift control logic block 346 has five inputs and two outputs. The input signals to the shift control logic block 346 include: the pointer register value signal 342, the victim signal 354, the advance queue signal 360, the delete item signal 368, and the shift carry in signal 370. The pointer register value signal 342 is the k-bit item register number from the corresponding pointer register. The victim signal 354 is the k-bit item register number of the item to be deleted from the queue. The shift control block 346 outputs include: a shift pointer register signal 348 and the shift carry out signal 372.

The behavior of the outputs of the shift control blocks can be described by the following equations:

Equation (1): shift carry out=(shift carry in OR (pointer value .EQ. victim))

Equation (2): shift pointer register=(advance queue OR (delete item AND shift carry out))

The value of each pointer register is compared to the value of the victim signal. The value of the pointer register that is equal to the victim signal indicates the pointer register that stores the item register number to be deleted. (There is always only one match). When the value of the victim and the value of the pointer register value are equal, the output of the comparator is high.

The output of the comparator 374 is ORed with the shift carry in signal 370 from the previous control block stage. The OR logic gates of the shift control blocks are electrically coupled so that the shift carry out signal of each stage is the shift carry in signal to the following stage. ORing the shift carry in signal with the result of the comparison of the pointer register value with the victim signal, means that every stage including and following the stage of the deleted item is shifted. This allows either a partial shift of the item register numbers stored in the pointer registers or a full shift in the case where the victim is stored in the front pointer register.

The result of the logical ORing of the shift carry in signal with the comparator signal is a high signal for each shift control block following the corresponding control block where there is a comparator equality match. The high signal is ANDed with the delete item signal. The output of the ANDing of the delete item signal with the shift carry out signal is ORed with the advance queue signal. Thus when either an item is deleted or an advance queue signal is received, the value in every corresponding pointer register following the stage of the equality match is shifted.

Figure 6:
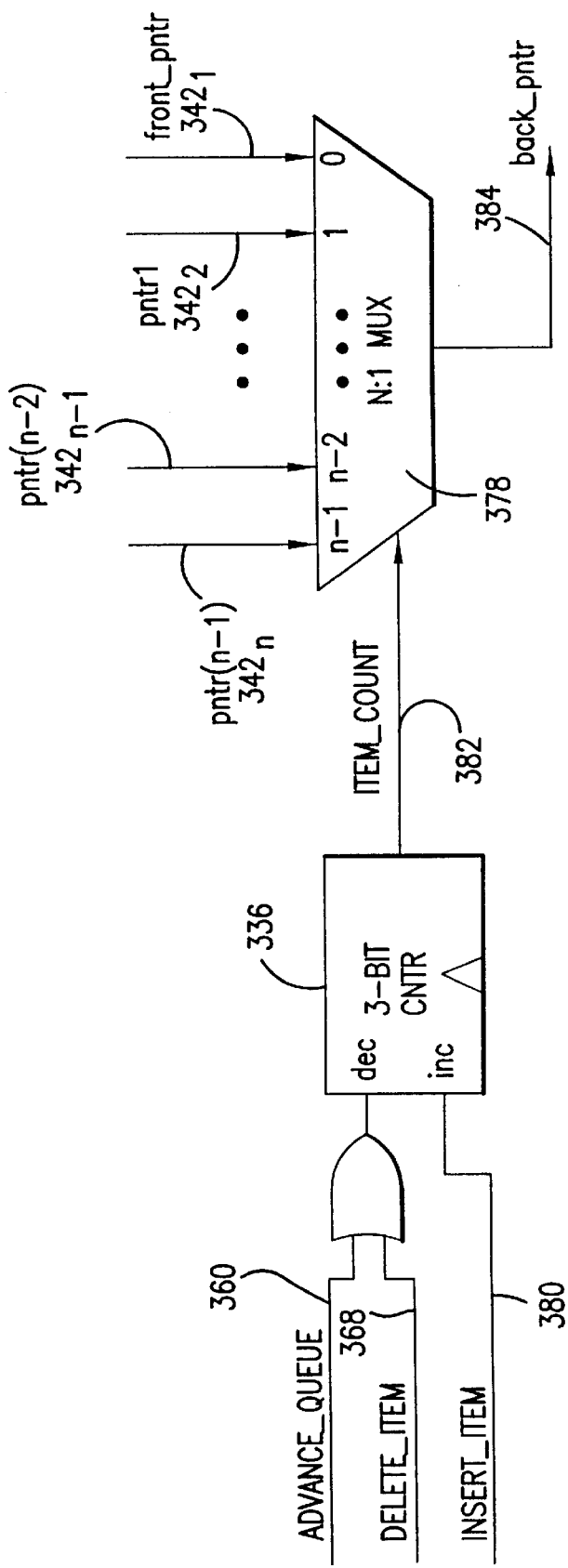
FIG. 6 shows a block diagram of the item counter and back-pointer multiplexor according to the present invention.

The control logic means 304 of the queue management control system 300 includes an item tracking means 306 which includes a sequence generation means 336 electrically coupled to a backpointer selection means 378. The item tracking means 306 keeps track of whether an item is valid or not and helps to determine where in the queue to put a new item of data. In the preferred embodiment, the sequence generation means 336 is an item counter and the backpointer selection 378 means is a multiplexor. FIG. 6 shows a block diagram of the item counter and back-pointer multiplexor according to the preferred embodiment. However, in an alternative embodiment the sequence generation means may be any means for generating a non-repetitive sequence of numbers responsive to a set of inputs. For example, the sequence generation means may be a state machine.

The item tracking means 306 is electrically coupled to the plurality of pointer storage means 308, so that information relating to the validity of an item can be used to effect the ordering of the values in the pointer registers 308. The sequence generation means 336 generates a unique sequence of non-repetitive values, where the number of non-repetitive values corresponds to the number of item storage means $302_1$–$302_n$. Further, each one of the non-repetitive values corresponds to one of the plurality of item storage means $302_1$–$302_n$.

Referring to the embodiment shown in FIG. 6, the sequence generation means 336 is an item counter. The item counter 336 keeps track of how many items are in the queue. In the preferred embodiment shown in FIG. 3 and FIG. 6, the item counter 336 is a simple k-bit up/down counter that starts at zero. The inputs to the item counter are: the insert item signal 380, and the result of the logical ORing of the delete item signal 368 and the advance queue signal insert item signal 360.

Referring to FIG. 6, the item counter 336 is incremented each time a new item is inserted into the queue (insert item signal high). The input to the decrement port of the item counter is the result of the logic ORing of the delete item signal 368 and the advance queue signal 360. Thus, the item counter is decremented each time an item is either discarded after being serviced (advance queue signal is high) or when an item is deleted (delete item signal is high). The output value of the item counter 382 (indicating how many items are in the queue) is the input signal into the back pointer multiplexor.

The back pointer multiplexor 378 is a simple N:1 multiplexor whose output, the back pointer signal 384, indicates which item register the next new item should be loaded into. The inputs to the back pointer multiplexor 384 are: the outputs of the pointer registers $308_1$ to $308_n$ and the output of the item counter signal 382. The output of the back pointer multiplexor 384 is the back pointer signal. The back pointer signal 384 points to the next available item register.

The backpointer multiplexor 384 is controlled by the value of the item counter and the order of the item registers (which is represented by the pointer register values $342_1$–$342_n$). When a new item is inserted (item counter incremented), the back pointer signal 384 is bumped but when an item is deleted or discarded, the value of the back pointer signal 384 is not effected.

The back pointer multiplexor 384 chooses one of the values that are input into the multiplexor based on the value of the item counter. Which signal is chosen by the back pointer multiplexor is a function of how many items are in the queue. According to the illustrative embodiment shown in FIG. 6, if the item counter signal has a value of zero, the multiplexor selects the value that is in the pointer register that is associated with a value of zero. For example, when the item counter value is zero, it selects the value of the front pointer register $308_n$. When the value of the item counter is equal to one it selects the value of the pointer $308_{n-1}$. When the value of the item counter is equal to (n−2) the multiplexor selects the value stored in the pointer register $308_2$. When the value of the item counter is equal to (n−1), the multiplexor selects the value stored in the pointer register $308_1$.

In the preferred embodiment, the control logic means includes a load signal decoding means 322 for determining which item register an item will be loaded into. The load signal decoding means 322 is electrically coupled to the item tracking means 306 and the item storage means $302_1$–$302_n$. The load signal decoding means 322 maps the backpointer signal 384 to an individual load signal.

Figure 7A:
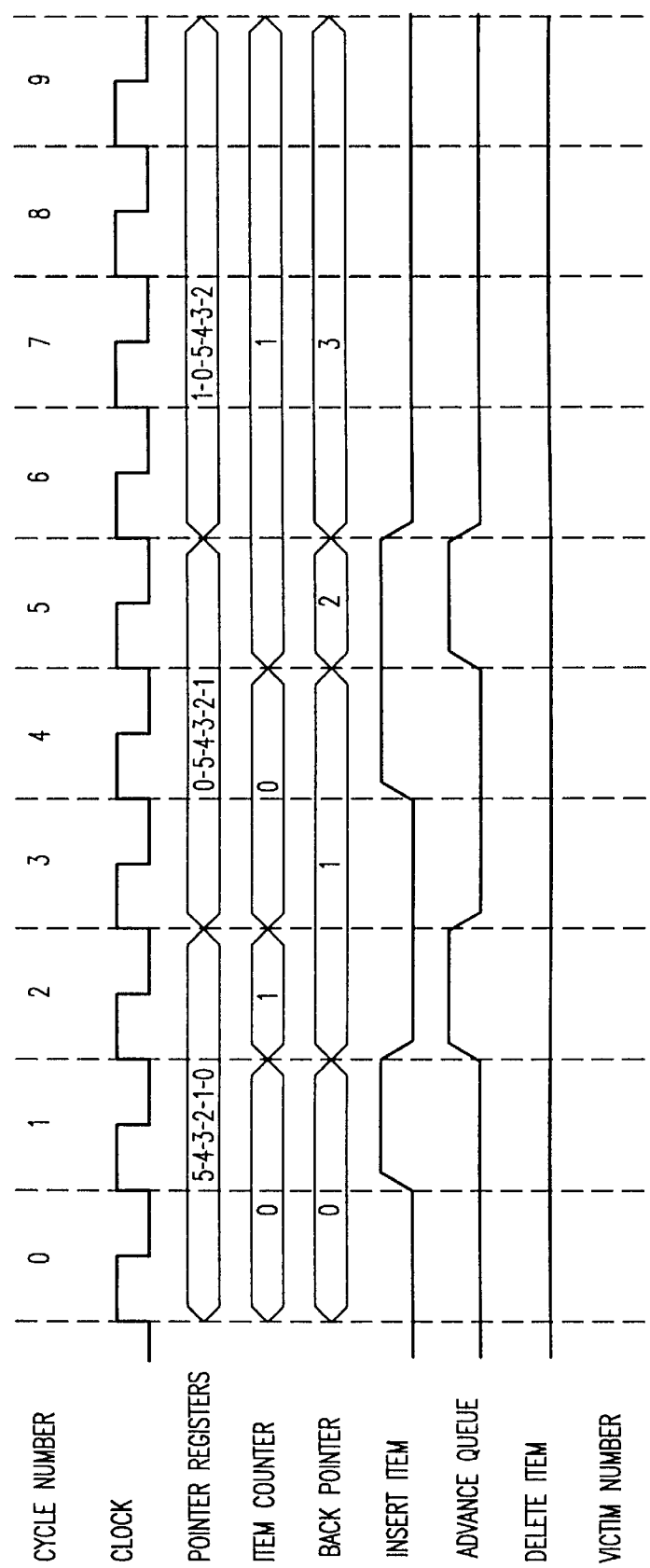
FIGS. 7A and 7B are timing diagrams for the queue management controller according to FIG. 3.
Figure 7B:
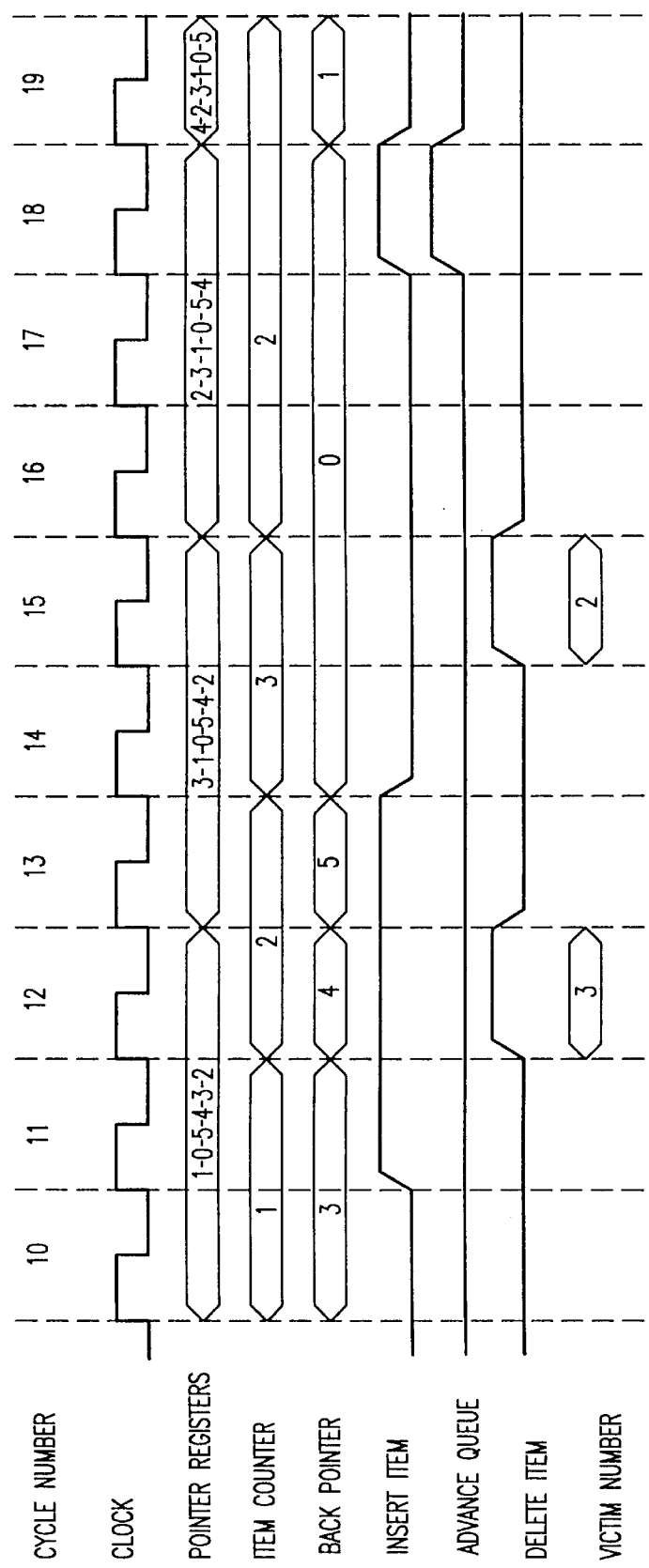

FIGS. 7A and 7B are timing diagrams for the queue management control system 300 according to FIG. 3. In the preferred embodiment, the queue management control system 300 operates synchronously. Referring to FIG. 7A, cycle 1 shows the first item being inserted into an empty queue. New items are always loaded into the item register indicated by the back pointer multiplexor output value. In cycle 1, the output value of the back pointer multiplexor is zero and the item is loaded into the item register corresponding to item register number zero. In order for the item to be inserted, the insert item signal goes high. Referring to FIG. 6, a high insert item signal causes the k bit item counter to increment by one. Thus in cycle 2, the item counter is incremented to one to denote a single item in the queue. In addition, as a result of the item counter being incremented, the value of the back pointer changes and is incremented by one (cycle 2).

In the queue management control system of the present invention, an item may be eliminated from the queue due to servicing by the servicing logic means or due to deletion of the item from the queue. Whenever the value of the item counter is greater than zero, the item pointed to by the front pntr register can be serviced. When servicing is complete, the advance queue signal is used to place that item register number in the pntr(n−1) register and shift all of the other pointer registers towards the front pntr register. At the same time, the item counter is decremented. Since the counter decrement occurs at the same time that the pointer registers are shifting, the output value of the back pointer multiplexor is not changed.

Cycle 2 begins the initiation of the process of discarding an item from the queue due to servicing of the queue. In cycle 2 of the timing diagram, the advance queue signal transitions to a high state causing the pointer registers to perform a full shift, shifting each value in the pointer register to the preceding register. Thus the order of the item register numbers in pointer registers $308_6$, $308_5$, $308_4$, $308_3$, $308_2$, and $308_1$ changes from 5-4-3-2-1-0 (cycle 2) to the 0-5-4-3-2-1 (cycle 3). A full shift of the pointer registers occurs after servicing an item or when an item is deleted from the queue because a decision was made to delete an item before servicing of the item. In the case of a deletion of an item, a full shift occurs only if the item is deleted from the front pointer register $308_n$. A partial shift occurs if the deletion occurs in any register other than front pointer register.

In response to the advance queue signal being high, the value of the item counter register is decremented (cycle 3). Thus in cycle 3, the value of the pointer registers is shifted so that the front pointer register $308_n$ has a value of 1 and the back pointer register $308_1$ has a value of 0. When an item is discarded from the queue by the advance queue signal, the item counter is decremented (cycle 3), however, the value of the back pointer remains the same.

In cycle 4, the insert item signal transitions to a high state, resulting in an increase in the item counter from 0 in cycle 4 to a value of one in cycle 5. Further, responsive to the change in the item counter, the n:1 multiplexor selects a new value (2) which is output to the backpointer signal.

New items can be inserted into the queue during advances and deletions. Cycle 5 shows an item being inserted into the queue at the same time that a different item is being advanced from the queue. Because an item is being discarded from the queue at the same time an item is being discarded, there is no change in the value of the item counter. The transition of the advance queue signal to a high state (see control logic block) causes a shifting of the contents of the pointer registers in cycle 6. Thus the order of the contents of the pointer registers changes from 0-5-4-3-2-1 in cycle 5 to 1-0-5-4-3-2 in cycle 6. Further because of the shift of contents in the pointer registers, and thus a shift of the inputs to the back pointer multiplexor, the back pointer multiplexor selects the value of three to be output.

In cycles 7, 8, 9 and 10 no new action is initiated by the queue management control system. In cycle 11, the insert item signal line goes high. An item is inserted resulting in the item counter being incremented to a value of two in cycle 12. Further, incrementing the item count, causes the back pointer multiplexor to shift its value selection to the value four. Insertion of an item does not case a shift in the contents of the pointer register.

In cycle 12, a request both to insert an item from the queue (insert item line high) and to delete an item from the queue (delete item signal is high) is made. When an item is deleted from the queue, its item register number appears on the victim bus and the delete item signal is asserted. The item number is simultaneously compared to the value in each of the pointer registers in the shift control blocks. There is always a match between the victim and exactly one of the values stored in the pointer registers. The matching pointer register and all those behind it perform a circular shift that moves the newly deleted item register number to pntr(n−1), pntr(n−2) to pntr(n−3) and so on through the matching pointer register. The pointer registers "ahead of" the match are unaffected. The item counter is decremented to reflect the deletion.

In cycle 12, the insert item line continues to be high. Thus an additional item will be inserted into the queue. Typically inserting an item into the queue would result in the item counter being incremented, however, because an item is concurrently being deleted from the queue (which results in a decrement in the item counter), the item counter does not change in cycle 12. In cycle 12, the item that is which is to be deleted is item number 3, the "victim.". Deleting the value "3" from the queue in cycle 12 causes the pointer registers to perform a partial shift, shifting the values "1-0-5-4" one step closer to the front of the queue and moving the value "3" into the last pointer registers.

Referring to cycle 13, the contents of the pointer registers is changed to the order 3-1-0-5-4-2to reflect the shifting of the contents of the pointer registers resulting from the deletion of item 3. Because an item was inserted into the queue, the value that the back pointer multiplexor selects is changed to the value 5. In cycle 13, the insert item line is high. The insert item line high causes an additional item to be inserted into the queue resulting in an increase in the item count in cycle 14 to a value of three. Further, incrementing the item counter causes the back pointer multiplexor to select an output value of zero, the next item register number in the current sequence after 5.

In cycle 15, the deletion of item number 2 from the queue is initiated (deleted signal is high). The deletion of item number 2 from the queue causes the item count to be decremented resulting in the item counter value of two in cycle 16. Deletion of item 2 causes a partial shift in the contents of the pointer registers in cycle 16 so that the contents of the pointer registers are changed from 3-1-0-5-4-2 in cycle 15 to 2-3-1-0-4 in cycle 16. The back pointer value does not change in this case.

In cycle 17, no new no new action is initiated by the queue management control system. In cycle 18, both the advance queue signal and the insert item signal are high. Because both the advance queue signal and insert item signal occur concurrently, there is no change in the value of the item counter. (The advance queue signal causes the item count to be decremented by one while the insert item signal causes the item counter to be incremented by one.) The advance queue signal causes a full shift in the contents of the pointer register. The contents of the pointer register change from the values 2-3-1-0-5-4 to the values of 4-2-3-1-0-5. Because of the shift of the value in the pointer registers, the output of the back pointer multiplexor changes to the value of 1.

Referring to FIG. 4, the output of the item registers is output onto the servicing logic bus which is coupled to the servicing logic unit. The details of the function of the servicing logic unit are well known and are not discussed in detail. To service an item, its register is selected for reading.

In the queue management controller described, the order of the contents of the pointer storage means changes pointer registers. In an alternative embodiment, the unique sequence of values is stored in a look up table in memory. Although the pointer storage means are not physically connected in a loop configuration as is shown in FIG. 4, the item registers (represented by the pointer storage memory contents) are accessed by the servicing logic means in a cyclical order.

It is understood that the above description is intended to be illustrative and not restrictive. The scope of the invention should therefore not be determined with reference to the above description, but instead should be determined with reference to the appended claims, along with the full scope of equivalents to which such claims are entitled.

What is claimed is:

1. A queue management control system comprising:
    a plurality of item storage means, the plurality of item storage means forming a queue of items to be serviced, wherein each of the plurality of item storage means may be individually accessed;
    a servicing logic means, wherein the servicing logic means is electrically coupled to the plurality of item storage means; and
    a control logic means for controlling the items in the queue, the control logic means controlling the addition and deletion of items in the queue, the control logic means electrically coupled to the plurality of item storage means, the control logic means including an item tracking means, a plurality of pointer storage means, and an item ordering means, wherein the item tracking means is electrically coupled to the plurality of pointer storage means, wherein the number of pointer storage means is equal to the number of item storage means, wherein the plurality of pointer storage means are set to a set of unique identifier values that map the plurality of item storage means to the plurality of pointer storage means, wherein the item ordering means is electrically coupled to the plurality of pointer storage means, wherein the item ordering means changes the order of the values stored in the pointer storage means to represent changes in the items in the queue.

2. The queue management control system recited in claim 1 wherein the plurality of item storage means are accessed by the servicing logic means in a cyclical order.

3. The queue management control system recited in claim 2 wherein the plurality of pointer storage means are connected in a loop configuration.

4. The queue management control system recited in claim 2 wherein the plurality of pointer storage means form a look-up table.

5. The queue management control system recited in claim 1 wherein the item tracking means is comprised of a sequence generation means and a backpointer selection means.

6. The queue management control system recited in claim 5 wherein the sequence generation means generates a unique non-repetitive sequence of values, wherein the number of non-repetitive values generated by the sequence generation means corresponds to the number of item storage means, wherein each non-repetitive value corresponds to one of the plurality of item storage means, wherein the sequence generation means is electrically coupled to the backpointer selection means.

7. The queue management control system recited in claim 1 further including a drive signal decoding means electrically coupled to a plurality of driving means and the plurality of pointer storage means, wherein responsive to a signal from the front pointer storage means, an enabling signal is input to one of the plurality of driving means.

8. The queue management control system recited in claim 1 further including a load signal decoding means, the load signal decoding means being electrically coupled to the item tracking means and the plurality of item storage means, wherein responsive to a signal from the item tracking means, the load signal decoding means outputs a load signal to one of the plurality of item storage means.

9. The queue management control system recited in claim 5 wherein the sequence generation means is an item counter.

10. The queue management control system recited in claim 5 wherein the sequence generation means is a state machine.

11. The queue management control system recited in claim 9 wherein a nonzero count indicates that the item pointed to by the front pointer storage means is valid and ready to be sent to the servicing means.

12. The queue management control system recited in claim 1 wherein the item ordering means includes a means for comparing a unique value representative of the item to be deleted to the values stored in the plurality of pointer storage means.

13. The queue management control system recited in claim 12 wherein the item ordering means including a shifting means, wherein responsive to a match between the unique value representative of the item to be deleted and a value stored in one of the plurality of pointer storage means, the shifting means shifts the contents of each of the plurality of pointer storage means after the matched pointer storage means.

14. A method of controlling deletions in a queue, comprising the steps of:
   comparing the value representative of an item to be deleted to the values stored in a plurality of pointer storage means; and
   responsive to a match between a value stored in the pointer storage means and the value representative of the item to be deleted, moving the value of the pointer storage means that matches the value of the item to be deleted to the back pointer storage means and shifting the contents of each of the plurality of pointer storage means after the matched pointer storage means.

15. The method recited in claim 14 further including the step of initializing the plurality of pointer storage means to a unique set of values, wherein the step of initializing the plurality of pointer storage means occurs before the step of comparing the value representative of the item to be deleted to the values stored in the plurality of pointer storage means.

16. The method recited in claim 14 further including the step of decrementing a sequence generation means.

\* \* \* \* \*